Feb. 27, 1962 W. G. GLASCOFF 3,022,600
FISHING TACKLE BUCKET
Filed Sept. 23, 1960
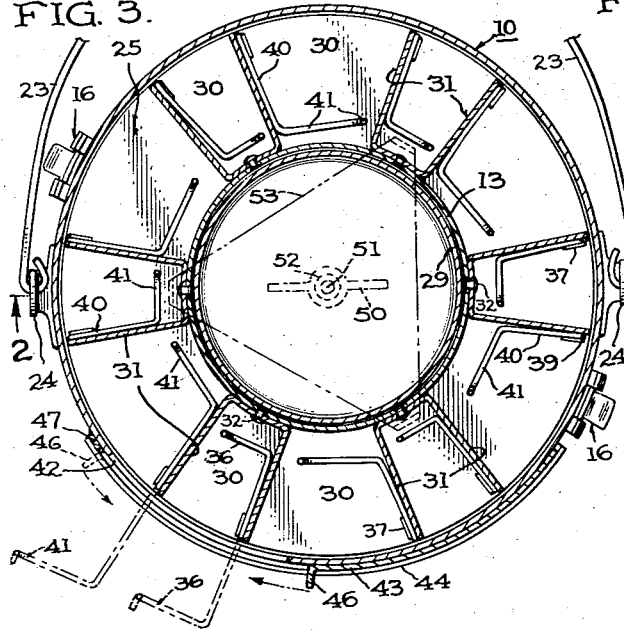
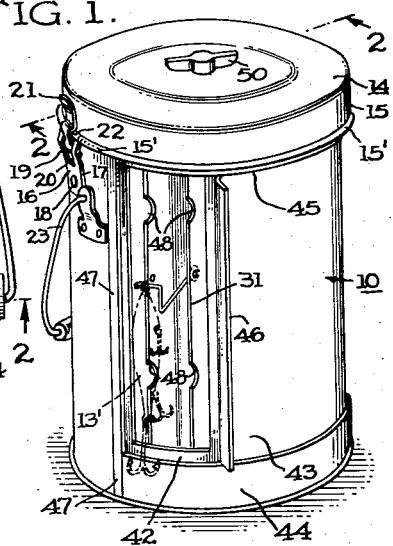
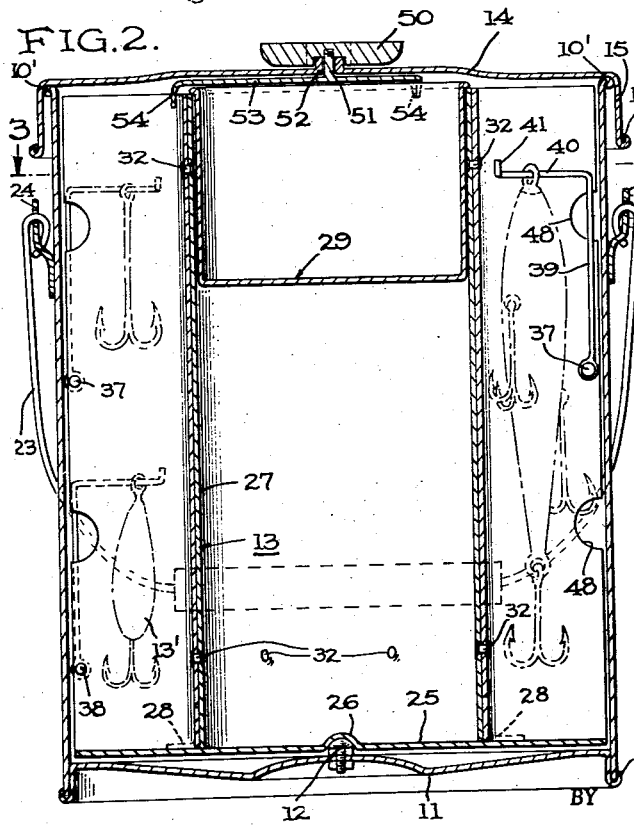
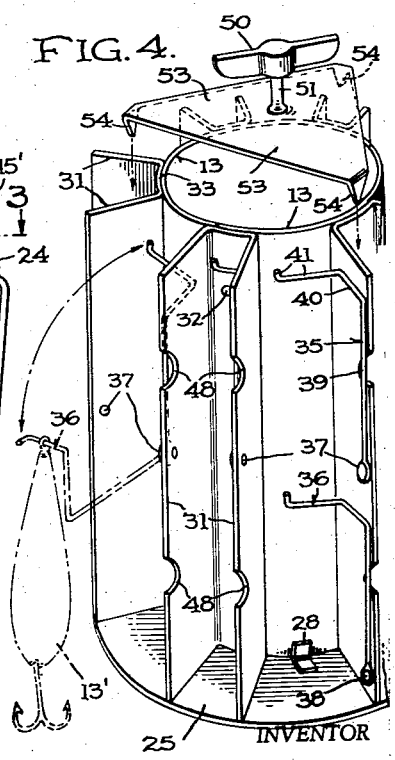
INVENTOR
WALTER G. GLASCOFF
BY Chas. M. Funkhouser
ATTORNEY

United States Patent Office 3,022,600
Patented Feb. 27, 1962

3,022,600
FISHING TACKLE BUCKET
Walter G. Glascoff, Waupun, Wis.
Filed Sept. 23, 1960, Ser. No. 58,075
11 Claims. (Cl. 43—54.5)

This invention relates to improvements in fishing tackle boxes or containers and more particularly to tackle carrier containers of the bucket receptacle type.

Many types and forms of containers for holding the various kinds of fishing tackle accessories have heretofore been proposed, and the present invention is directed to a form of receptacle which contains novel features and arrangements for the greatest needs and convenience of the fisherman.

One of the great disadvantages of the present day tackle containers is that they do not provide for accommodating a desired large variety of lines, hooks, lures, plugs, and the like in an orderly fashion to maintain the same accessible at all times with a minimum amount of confusion and entanglement. This is particularly true when the ordinary present day container is packed in a duffle bag and shaken about during transportation. It frequently happens when the container is in use in a boat or other confined space and the fisherman is in the act of selecting a desired lure or bait, the container is upset and the contents are scattered about the place or boat and become entangled and cause attendant annoyances and difficulty in locating the desired articles. Many a time, the ordinary metal tackle box is taken on a boat and placed on the seat beside the fisherman and when the box is open, the entire contents are exposed and when an unforeseen accident occurs, the entire contents are lost overboard because the whole tackle box sinks immediately.

An important object of the present invention is to provide a tackle container which shall minimize and eliminate many of the difficulties experienced with the present day tackle containers in practical usage.

Another object of the invention is to provide a novel corrosion resistant metal tackle container of the bucket type including cover and bail handle to facilitate handling.

A further object of the invention is to provide an improved container of the character designated having a rotatable and removable compartmented interior which shall accommodate a larger variety of fishing equipment than similar devices now in use.

A further object of the invention is to provide a simplified actuating mechanism for rotating the compartments for outside viewing of the contents and also permit selective accessibility from outside the container for any of the special articles in the container.

A further object of the invention is to provide individual pivotally mounted tackle hangers in the compartments which shall be movable outwardly to mount or remove the lures, and inwardly to hold or maintain the lures in a fixed position in the particular compartment without damage occasioned by rough handling of the container while in use.

A further object of the invention is to provide a light weight sheet metal bucket container having a novel form of cover and associated sheet metal actuator for revolving the interior compartmented sections.

A still further object of the invention is to provide a novel form of sheet metal slide side opening for the container which shall permit access to the compartments and substantially seal the interior of the container against the ingress of moisture.

These and other objects of the invention will be more manifest from the specification and drawings and more particularly set forth in the claims.

In the drawings:
FIGURE 1 is a perspective view of the fishing tackle container with the side slide door open;
FIGURE 2 is a vertical sectional view on line 2—2 of FIGURES 1 and 2;
FIGURE 3 is a horizontal sectional view on line 3—3 of FIGURE 2; and
FIGURE 4 is a vertical fragmentary perspective view of the rotatable and removable interior compartments and the cover carrier actuating mechanism therefor.

Referring to FIGURES 1 and 2 of the drawing, there is shown a cylindrical bucket shaped fishing tackle container 10 constructed and arranged in accordance with the present invention. The entire container is preferably made throughout of light weight non-corrosive material and preferably sheet metal such as aluminum, stamped or drawn for this purpose. The bottom of the container is formed by a tight fitting metal disc 11 having its peripheral edges rolled over the bottom edges of the side walls 10 and thus provide a more durably constructed and reinforced water tight connection as indicated at 11'. The central portion of the bottom is provided with a bearing member 12 to position and centrally support a rotatable and removable fabricated metal compartment unit 13 hereinafter more fully described.

The container is closed by a removable aluminum metal cover 14 having a straight drawn peripheral edge flange 15 to closely fit the top rolled-over reinforced top edge 10' of the container wall 10 and thus provide a more durable close fitting water tight connection for the top portion of the bucket container. The lower edge of the flange is rolled outwardly as at 15' and this outward roll being spaced from the container wall provides a convenient hand grip for applying and removing the cover. The cover 14 is securely retained in positive position by a pair of oppositely disposed spring operated latch members 16—16 mounted at the top portion of the wall 10 adjacent the cover. Each latch member includes a spring plate member 17 having its lower ends fixedly mounted on the wall 10 by any suitable connection such as a rivet 18. The free end of the plate 17 includes an angle portion 19 serving as a cam and having a sloted opening 20 to receive the lower end of a bifurcated thumb operated latch member 21 having a transverse groove 22 to receive the beaded edge 15' of the cover when swung into engagement therewith as shown in FIGURE 1 and thus hold the cover securely in place.

The container is handled in the usual manner by a bail member 23 connected to the container 10 by suitable ear connection members 24—24 projecting outwardly so as to hold the bail free of the cover flanges and the cover latches when in a carrying position.

The interior of the container encloses the inner rotatable and removable compartmented cylindrical sheet metal member 13 constructed and arranged to hold and position all the usual type of fish lures, lines, and accessories indicated generally by the numeral 13'. As shown in FIGURES 2, 3, and 4, the member 13 includes a large metal disc bottom member 25 having its peripheral edges movable adjacent the container side walls 10 and supported centrally by a formed bearing recess 26 adapted to receive the bearing member 12 and thus accurately position the cylindrical compartments. Secured to the disc bottom 25 is a centrally disposed metallic cylindrical wall member 27 forming an inner compartment extending centrally of the container 10 and having its rolled top rim portion adjacent the cover 14. The cylinder wall 27 is anchored to the bottom disc 25 in any suitable manner as by peripherally spaced cleats 28—28 to form a substantially tight compartment for receiving various kinds of fishing tackle and accessories. Closing the top of the cylinder compartment 27 is a relatively loose fitting removable cup receptacle 29 which may be used to retain other material, accessory articles, or moist substance of any kind if needed for any purpose.

An important feature of the present interior arrangement is the provision of a plurality of individually separated compartments 30—30 for retaining and storing a longer length of lures. These compartments are formed on the outer peripheral wall of the cylinder 13 by substantially U-shaped aluminum sheet metal units having radially extended sides 31—31 as shown in FIGURES 3 and 4. Each of these units is secured to the cylinder wall as an integral part thereof in any suitable manner as for example, rivets indicated by numerals 32—32. It will be noted that the base of each U-shaped unit is curved transversely throughout its length as indicated at point 33 so as to conform to the curvature of the cylinder wall 13 and thus provide a simple construction which shall be a more durable and efficient construction made from stamped metal. It will also be noted that the U-shaped units are spaced apart around the cylinder 13 so as to provide outwardly opening compartments of a different capacity. This arrangement is particularly desirable to provide for a large variety of different lures of different sizes and lengths and make the same individually and selectively accessible at all times.

Located on the walls of each compartment are conveniently placed tackle holders or hanger devices 35—36 for large lures, leaders, etc. These holding devices preferably consist of a heavy wire section having one end pivotally mounted on the walls 31—31 in any suitable manner as by pivot pins 37—38 respectively where two short lures are in one compartment. In the larger compartments there may be only one such hanger to take care of a single long heavy lure as the case may be. The hangers are all of substantially the same form and consist of a long body portion 39 lying close to the wall, an angular inwardly projecting cross top portion 40 which terminates in a conveniently upstanding cross bar hook portion 41 adjacent the rear wall. The arrangement is such so as to retain the articles held thereon off center of the pivotal support of the respective hangers. One important feature of this arrangement of hangers is that each may be swung outwardly of the compartment and through the bucket container side wall opening for any purpose, such as selection of an article, removing it from the hook, and replacing it on the hook without entanglement or interference with other articles in the container. A further advantage of the present arrangement is off-center pivot arrangement of the mounted hangers so that the articles are maintained against the rear wall and not thrown outwardly and scraping against the cylinder walls by centrifugal force when the cylinder is rotated for making a desired selection of lure.

The several wire bait holders 35—36 are manipulated through the closure opening 42 by means of suitably arranged finger notches 48—48 provided in the vertical side edges of the respective compartment walls and these notches normally bisect the wires extending across the same when in storage position and thus make the bait conveniently accessible.

Access to the compartments is had by an opening 42 in the side wall of the container bucket. This opening is controlled by a close fitting arcuately curved sliding metal door closure 43 supported in curved lower and upper sheet metal guides 44—45 mounted on the container walls and overlapping so as to be substantially water tight. The front edge of the door 43 is curved or rolled outwardly to form a rib handle 46 for operating the door and this handle edge is adapted to fit against the sheet metal bucket seam 47 to form a close fitting contact edge to make the same substantially water tight. This arrangement adds materially to the utility of the tackle box and thereby reduces the hazard of the tackle bucket from sinking when accidentally dropped overboard.

Another important feature is the separable actuating mechanism for rotating the carrier 13 forming the several compartments. This mechanism is mounted on the cover 14 and includes an outside knob 50 connected to a shaft 51 mounted in a bearing 52. The shaft 51 extends on the underside of the cover and is rigidly connected to a sheet metal plate disc operating member 53 having peripherally spaced downwardly extending triangular drive projections or wedge shaped projections 54—54. This operating plate 53 is conveniently made at one sheet metal stamping operation at a great saving of time and materials. The triangular shaped projections insure proper engagement with the top edges of the compartment walls 31—31 regardless of the position of the cover with respect to the receptacle body 10.

Another important advantage of the wedge shaped engagement contact members 54—54 is that they accurately and positively maintain the alignment of the rotatable compartment walls 31—31 in the tackle box casing 10. Furthermore, when the cover 14 is clamped in position, these members also firmly hold the rotatable compartment in firm contact with the bottom bearing 26 so as to effect free rotatable movement thereof and prevent the same from striking the outer container wall 10. This construction and arrangement is of further importance because many times during the practical use of the tackle box the parts may be assembled quickly and without any danger of misalignment of the engaging parts and resultant damage to the several interfitting and moving parts.

While I have shown a preferred embodiment of my novel tackle bucket, it is obvious that various changes may be made in the specific arrangements of the compartments without departing from the invention as defined by the following appended claims.

What I claim is:

1. A bucket type fishing tackle container including side walls, bottom, and having a removable cover, a vertically mounted rotatable cylindrically shaped compartmented interior frame member pivotally supported centrally of said container, said frame member having a dis-shaped bottom member commensurate with the bucket side walls, said compartmented member having a central cylindrical wall member having its bottom edges united to said disc bottom to form a compartment, a plurality of spaced apart vertically disposed partition wall members formed integral with said disc and said cylinder and extending radially from the exterior wall of said cylindrical compartment to form a plurality of circumferentially disposed open-sided compartments extending substantially the depth of the tackle container, a vertically disposed side opening formed in said container wall and means mounted on the cover for rotating the compartments to selectively register with said side opening.

2. Apparatus of the character described in claim 1 including a sliding arcuate closure member for the side opening in the container, upper and lower arcuate plate guides mounted on the container walls to receive the upper and lower edge portions of the closure in overlapping relation and a rolled vertical front edge formed on the closure to form a handle to operate the closure.

3. Apparatus of the character described in claim 1 wherein the top peripheral edge of the bucket container wall is rolled outwardly to frictionally engage a depending peripheral cover flange, said cover flange having the lower edge thereof rolled outwardly to provide a space between said lower edge and said container walls whereby easy separation of the parts is effected.

4. Apparatus of the character described in claim 3 including latch means mounted on the container walls for engaging the rolled edge of the cover.

5. Apparatus of the character described in claim 1 including separately mounted lure hangers on the wall of each of the radial compartments formed by said radial partition walls, said hangers having their base ends pivotally mounted near the outward edge of the partition wall and the lure engaging end positioned adjacent the rear wall of the compartment and off center of said pivot mount and means to facilitate swinging movement of the lure hooks outwardly and inwardly through the opening in said container.

6. Apparatus of the character described in claim 5 including finger notches formed in the outer edge of the partition walls and bisecting the hanger wires crossing the same when the wires are in normal storage position in the radial compartment associated therewith.

7. Apparatus of the character described in claim 1 wherein the centrally disposed cylindrical compartment is closed by a telescopic receptacle fitting in the top portion thereof and means at the top edge of said telescopic receptacle for holding the same in position.

8. Apparatus of the character described in claim 1 wherein the rotatable compartment operating means includes a rotatable plate member mounted on the underside of said cover, spaced apart downwardly stuck projections formed on said plate for engaging some of the top edges of said partition walls in driving relation thereto for rotating said compartmented frame.

9. A sheet metal bucket type fishing tackle container comprising in combination a cover, a vertically mounted rotatable cylidrical shaped compartmented interior frame member arranged to form a plurality of different size and shape compartments, said frame including a bottom disc member pivotally mounted centrally of said bucket bottom, a centrally disposed metal cylinder mounted on said disc member to form a central compartment, a cup shaped receptacle closure for the upper portion of said central compartment, a plurality of substantially U sheet metal units secured to the cylinder and having partition walls radially therefrom to form compartments of different sizes, and means mounted on the cover for rotating the frame to selectively position the several compartments for selective access.

10. A sheet metal bucket type fishing tackle container comprising in combination a cover, a vertically mounted rotatable cylindrical shaped compartmented interior frame member arranged to form a plurality of different size and shape compartments, said frame including a bottom disc member pivotally mounted centrally of said bucket bottom, a centrally disposed metal cylinder mounted on said disc member to form a central compartment, a bearing at the bottom of said container for centering said frame compartment disc in said container, a plurality of substantially U-shaped sheet metal units secured to the cylinder and having partition walls radially therefrom to form compartments of different sizes, and means mounted on the cover in axial alignment with said bearing for rotating and centering the frame to selectively position the several compartments for selective access.

11. Apparatus of the character described in claim 10 in which the frame rotating means includes a center bearing shaft mounted in the cover, an operating knob at the outer extremity thereof, a plate member mounted at the inner extremity thereof and located adjacent said inner cover surface, and a plurality of angularly spaced downwardly extending wedge shaped projection members for engaging said compartment walls at any angular position to center said frame relative to said container walls.

References Cited in the file of this patent

UNITED STATES PATENTS

| | | |
|---|---|---|
| 2,214,993 | Dewitt | Sept. 17, 1940 |
| 2,665,517 | Archer | Jan. 12, 1954 |
| 2,765,576 | Kurek | Oct. 9, 1956 |
| 2,814,152 | Trujillo | Nov. 26, 1957 |
| 2,854,783 | Armand | Oct. 7, 1958 |